Patented May 30, 1933

1,912,017

UNITED STATES PATENT OFFICE

GAMES SLAYTER, OF DETROIT, MICHIGAN, ASSIGNOR TO OWENS-ILLINOIS GLASS COMPANY, A CORPORATION OF OHIO

HEAT INSULATOR

No Drawing.   Application filed September 23, 1931.   Serial No. 564,706.

This invention relates to an improved insulating material and method of making same and it is one of the objects of the invention to provide an insulating material made out of slag, glass or other substance formed into cellular structure containing a relatively low gas pressure in the cells when cooled to the temperature at which it is used.

A unique feature of the invention is the introduction of a gasifying agent which returns to a liquid or solid state at ordinary temperatures, thus leaving a "vacuum" in the cells of the glass foam, or other material used.

It has been noticed that all insulating material containing air spaces improved tremendously in insulating value on being inclosed in an air tight vessel and evacuated. It appears that in a comminuted material of relatively low density, the entrapped air is the chief carrier of the heat. The conductivity of a sample of diatomaceous earth which was 0.50 was reduced to .08 by evacuation.

The present invention proposes to prepare an insulating material of great efficiency by making a slag or glass foam using the gas of some material which is solid or liquid at ordinary temperature to form the cells. Such a material can be prepared by introducing mercury or molten zinc through a pipe into a container of molten glass or slag. The heat of the slag or glass would immediately cause the mercury or zinc to vaporize and with stirring, a light foamy mass can be formed. The glass or slag when cooled sufficiently supports itself before the vapor in the cell condenses. If glass is used, it should preferably be annealed. Throughout the useful range of temperatures this slag foam or glass foam will contain a "vacuum" in its cells. This foam can be used either in granular form as a loose filler, or can be shaped into blocks, pipe covering, etc.

I am aware that apparatuses have been previously used for whipping air into furnace slag, as, for example, in the patents to Luckenbach, No. 133,466, and M. O. Sem, Nos. 1,458,858 and 1,471,421, the apparatuses of which could be used in carrying out the present invention, or similar apparatus constructed in which the gasifying agent in the liquid form could be introduced near the bottom of the container and the molten glass or slag could be run into the container and when it is about half full, the agitators could be rotated rapidly. The violent agitation would whip the glass into a foam as the heat of the glass gasifies the liquid. The resultant foam could then flow off through a trough near the top of the container and be shaped into bricks, slabs, or other insulating shapes.

Modifications may be resorted to within the spirit and scope of my invention.

What I claim is:

1. The method of forming a glass or slag foam, the gas constituent of which condenses at a relatively high temperature, which comprises melting glass or slag, mixing with the molten material a substance which volatilizes or gasifies at a substantially lower temperature than the melting temperature of the glass or slag and solidifies at a temperature substantially higher than atmospheric temperatures, agitating the mixture to produce a foam, and then cooling the mixture to first solidify the glass or slag, and at a lower temperature solidify the volatilized material and thereby produce a vacuum in the cells of the foam.

2. The method of producing an insulating material which consists in mixing molten vitreous material with a metal which vaporizes at a temperature below that at which the vitreous material solidifies and which condenses at a temperature above atmospheric temperatures, agitating the mixture and thereby producing a foam, then cooling the foam, causing the vitreous material to solidify, and at a lower temperature causing the metal to condense.

3. The method which consists in melting a vitreous material, mixing it with a metal, agitating the mixture and producing a foam, and cooling the foam, causing it to solidify and causing the intermixed metal to condense.

4. As an article of manufacture, a refractory cellular material, the cells of which contain a substantial vacuum and a non-refractory substance which vaporizes at a temperature below that at which the said refractory material solidifies, and solidifies at a temperature above 100 degrees Fahrenheit, said substance being distributed in said cells and occupying only a small fraction of the space within the cells.

5. As an article of manufacture, a refractory cellular material, the cells of which contain condensed metal occupying only a minute fraction of the cell chambers.

6. As an article of manufacture, a block of vitreous material cellular throughout its structure, the cells containing a substantial vacuum and a metal which is in condensed form at atmospheric temperatures.

7. An insulating material comprising a vitreous base in the form of a foam, and a condensed metal within the cells of said material.

8. A glass foam having condensed metal within its cells.

9. A refractory insulating material comprising a vitreous cellular base, the cells of which contain a non-vitreous material which throughout the range of atmospheric temperatures is in the form of a solid and occupies a small fraction only of the cell chambers.

Signed at Toledo, Ohio, this 12th day of September, 1931.

GAMES SLAYTER.